(12) United States Patent
Kubusch

(10) Patent No.: US 8,701,925 B2
(45) Date of Patent: Apr. 22, 2014

(54) MOBILE MACHINE WITH A PRESSURIZED TANK

(75) Inventor: Dietmar Kubusch, Buchholz (DE)

(73) Assignee: STILL GmbH, Hamburg (DE)

( * ) Notice: Subject to any disclaimer, the term of this patent is extended or adjusted under 35 U.S.C. 154(b) by 1448 days.

(21) Appl. No.: 11/517,800

(22) Filed: Sep. 8, 2006

(65) Prior Publication Data

US 2007/0056976 A1 Mar. 15, 2007

(30) Foreign Application Priority Data

Sep. 9, 2005 (DE) .................. 10 2005 042 939

(51) Int. Cl.
*F17C 1/00* (2006.01)
*F17C 1/14* (2006.01)

(52) U.S. Cl.
USPC .............. 220/562; 220/560.04; 220/581

(58) Field of Classification Search
USPC ............ 220/562, 563, 564, 586, 581, 553, 220/560.11, 555, 560.04, 669, 560.12
See application file for complete search history.

(56) References Cited

U.S. PATENT DOCUMENTS

| | | | | |
|---|---|---|---|---|
| 308,948 A | * | 12/1884 | Bruce | 220/562 |
| D250,123 S | * | 10/1978 | Berwald | D23/205 |
| 4,858,778 A | * | 8/1989 | Patrick | 220/562 |
| 4,878,591 A | * | 11/1989 | Johnston | 220/651 |
| 5,673,939 A | * | 10/1997 | Bees et al. | 280/831 |
| 5,779,078 A | * | 7/1998 | Reddy | 220/1.5 |
| 6,047,747 A | * | 4/2000 | Bowen et al. | 141/231 |
| 6,095,367 A | * | 8/2000 | Blair et al. | 220/581 |
| 6,257,360 B1 | * | 7/2001 | Wozniak et al. | 180/69.5 |
| 6,412,650 B1 | * | 7/2002 | Warner | 220/4.12 |
| 6,676,163 B2 | * | 1/2004 | Joitescu et al. | 280/834 |
| 7,137,474 B2 | * | 11/2006 | Yokote | 180/314 |
| 7,270,209 B2 | * | 9/2007 | Suess | 180/69.5 |
| 2004/0026427 A1 | * | 2/2004 | Shigematsu | 220/562 |
| 2004/0211784 A1 | * | 10/2004 | Luongo | 220/581 |
| 2005/0023236 A1 | * | 2/2005 | Adams et al. | 215/3 |

* cited by examiner

*Primary Examiner* — Mickey Yu
*Assistant Examiner* — Niki Eloshway
(74) *Attorney, Agent, or Firm* — The Webb Law Firm

(57) ABSTRACT

A mobile machine, in particular a counterweighted fork lift truck, has at least one pressurized tank, in particular to carry fuel that is in a gaseous state under normal conditions. The tank has an at least approximately rectangular external contour in at least one cross-sectional plane.

13 Claims, 3 Drawing Sheets

MOBILE MACHINE WITH A PRESSURIZED TANK

CROSS-REFERENCE TO RELATED APPLICATION

This application claims priority to German Application No. 10 2005 042 939.4, filed Sep. 9, 2005, which application is herein incorporated by reference in its entirety.

BACKGROUND OF THE INVENTION

1. Field of the Invention

This invention relates to a mobile machine, in particular a counterweighted fork lift truck, with at least one pressurized tank for carrying fuel which is in a gaseous state under normal conditions. The invention also relates to a pressurized tank for an industrial truck.

2. Technical Considerations

Mobile machines are frequently operated with fuels that are in a gaseous state under normal (e.g., ambient) conditions. In addition to hydrocarbon-based fuels, such as propane, butane and methane, increasing use is being made of hydrogen, which can be used to operate a fuel cell unit, for example. The mobile machine generally has one or more pressurized tanks for the storage of these fuels. To be able to store the largest possible quantity of fuel, the tanks are generally pressurized at relatively high pressures, conventionally more than 25 bar and typically on the order of magnitude of 200 bar, as high as 350 bar for hydrogen, and, in individual cases, as high as 700 bar.

In mobile applications, an objective is generally to make the components as lightweight as possible to increase the cargo-carrying capacity of the vehicle. With fuel tanks of the known art, attempts have consequently been made to design the fuel tanks so that they are as lightweight and simultaneously as stable as possible, for which reason aluminum alloys or compound materials are used. An additional objective of tanks of the known art is to achieve maximum filling pressures and, therefore, maximum filling quantities while using the minimum quantities of material. As a result of which, the tanks are generally cylindrical or spherical in shape with an approximately uniform wall thickness. However, tanks of this type utilize the available space inefficiently, especially if two or more such tanks are located next to each other because unused space remains between the tanks or between the tanks and a housing wall, which is generally flat and straight. Locating the tank(s) at a location outside the chassis of the vehicle, as is frequently done on vehicles that are operated with liquefied natural gas, avoids this problem but has the disadvantage that the tank is exposed without protection to environmental factors, including but not limited to mechanical damage and solar radiation. Additionally, outboard installation restricts accessibility to the vehicle and/or the view of the vehicle operator. The installation of additional components in the vicinity of tanks of the known art is also made more difficult on account of the round geometry, and frequently requires complex and expensive supplemental brackets and mountings which are attached to the surrounding frame or housing components.

An object of the invention is, therefore, to create a mobile machine, in particular a counterweighted fork lift truck, with at least one pressurized tank, in particular to carry fuel that is in a gaseous state under normal (i.e., ambient) conditions, which has a high level of operational safety and reliability and a long period of operation, has a simple construction, makes optimal utilization of space, and makes possible particularly economical operation.

An additional object of the invention is to create a pressurized tank for a mobile machine that has a high level of operational safety and a long period of operation, has a simple construction, and makes possible particularly economical operation.

SUMMARY OF THE INVENTION

The invention provides a mobile machine having a tank that has an at least approximately rectangular external contour in at least one cross-sectional plane. The external contour is thereby free of major indentations, bulges or projections, e.g., of the type that are present on an approximately hourglass-shaped structure or as a result of the complex, time-consuming and expensive attachment of support feet or rings. Consequently, the tank can be located in a particularly space-saving manner on an at least likewise approximately flat molded housing wall and/or framed plate girder of the industrial truck. In particular, the tank can be located efficiently in corners of the housing and/or of the frame because it occupies these spaces optimally. The fastening of the tank is also facilitated because a uniform support of the tank on the housing and/or frame parts is achieved.

It is particularly advantageous if the pressurized tank has an approximately rectangular external contour in three cross-sectional planes that are approximately perpendicular to one another. The tank thereby has an approximately cuboid shape and can be fitted particularly efficiently in empty spaces of the industrial truck that are likewise shaped. In particular, in industrial trucks in which a conventional battery is replaced by an energy supply unit with fuel cells and a fuel tank, the energy supply unit has an external contour that is approximately identical to the external contour of the cuboid battery tray. A cuboid tank can be installed in a particularly space-efficient manner in an energy supply unit of this type. The installation of additional components in the vicinity of the tank is also facilitated because there are flat support surfaces and contact surfaces on all sides of the tank.

It is particularly advantageous if at least one pressure chamber of the pressurized tank has an approximately circular or arcuate cross section in at least one cross-sectional plane. Circular or curved cross sections are easy to manufacture and are particularly well suited for the pressure chamber because they eliminate the occurrence of dangerous stress peaks at high pressures. Defined maximum or minimum tapping or bleed points for the contents also become easy to realize.

By providing the pressure chamber of the pressurized tank with a coating, the pressure tightness of the tank can be improved and the tank itself can be protected against damage, e.g., from corrosion.

The pressurized tank can be made of a ferrous material, in particular steel. Ferrous materials are economically available and are easy to work. The properties can be effectively adapted to meet the requirements of the specific application by means of alloying and heat treatment. It is possible to fabricate an original molding close to the final shape by casting and/or forging with relatively little effort and at relatively low cost. Steels have, among other things, the toughness desired for the intended purpose. Ferrous materials also have a relatively high density so that the tank becomes relatively heavy. In particular, when the pressure chamber has a circular cross section and the external contour has a rectangular cross section, the ferrous material of the tank is present in the corner areas that remain unoccupied in tanks that have a circular external contour, which means that the tank is significantly heavier than a conventional tank of the same volume that effectively occupies a similar amount of space, which can have significant advantages on mobile machines.

It is appropriate if the pressurized tank has a base body and at least one closing element. Because the tank is constructed from at least two parts, the fabrication process is facilitated. With a standard base body and the use of different closing elements, it thereby becomes possible to adapt the tank to the specific conditions in which it is used, in particular to the fuel used or the location in which it is installed.

It is particularly advantageous if the closing element comprises at least one fitting and/or at least one connection device for at least one fitting and/or a pipe. The presence of these fittings and/or connection devices reduces the amount of effort required for installation because the connecting device or the fitting can be installed together with the closing element. For different connection requirements, the same base body of the tank can be adapted to other connection conditions by another closing element.

In an additional configuration of the invention, it is advantageous if the base body of the pressurized tank comprises at least one connecting device for at least one fitting and/or at least one pipe. Devices to fill and/or empty the tank can thereby be connected easily.

In one advantageous development of the invention, the pressurized tank has at least two separate pressure chambers, thereby making it possible to store different gases in the tank. The pressure chambers can also be pressurized at different pressures.

It is particularly advantageous if the pressurized tank has devices for the fastening of the pressurized tank, in particular to the vehicle and/or to additional tanks. The time and effort required for the installation are thereby reduced, and fastening devices to the frame or to housing parts of the industrial truck are no longer necessary.

In one advantageous configuration of the invention, the pressurized tank is provided for the storage of hydrogen. Hydrogen has a number of advantages as a power source for industrial trucks in particular, including the absence of harmful emissions.

BRIEF DESCRIPTION OF THE DRAWINGS

Additional advantages and details of the invention are explained in greater detail below on the basis of the exemplary embodiment illustrated in the accompanying drawings. Identical parts are identified with the same reference numbers throughout.

DESCRIPTION OF THE PREFERRED EMBODIMENTS

Figure 3:
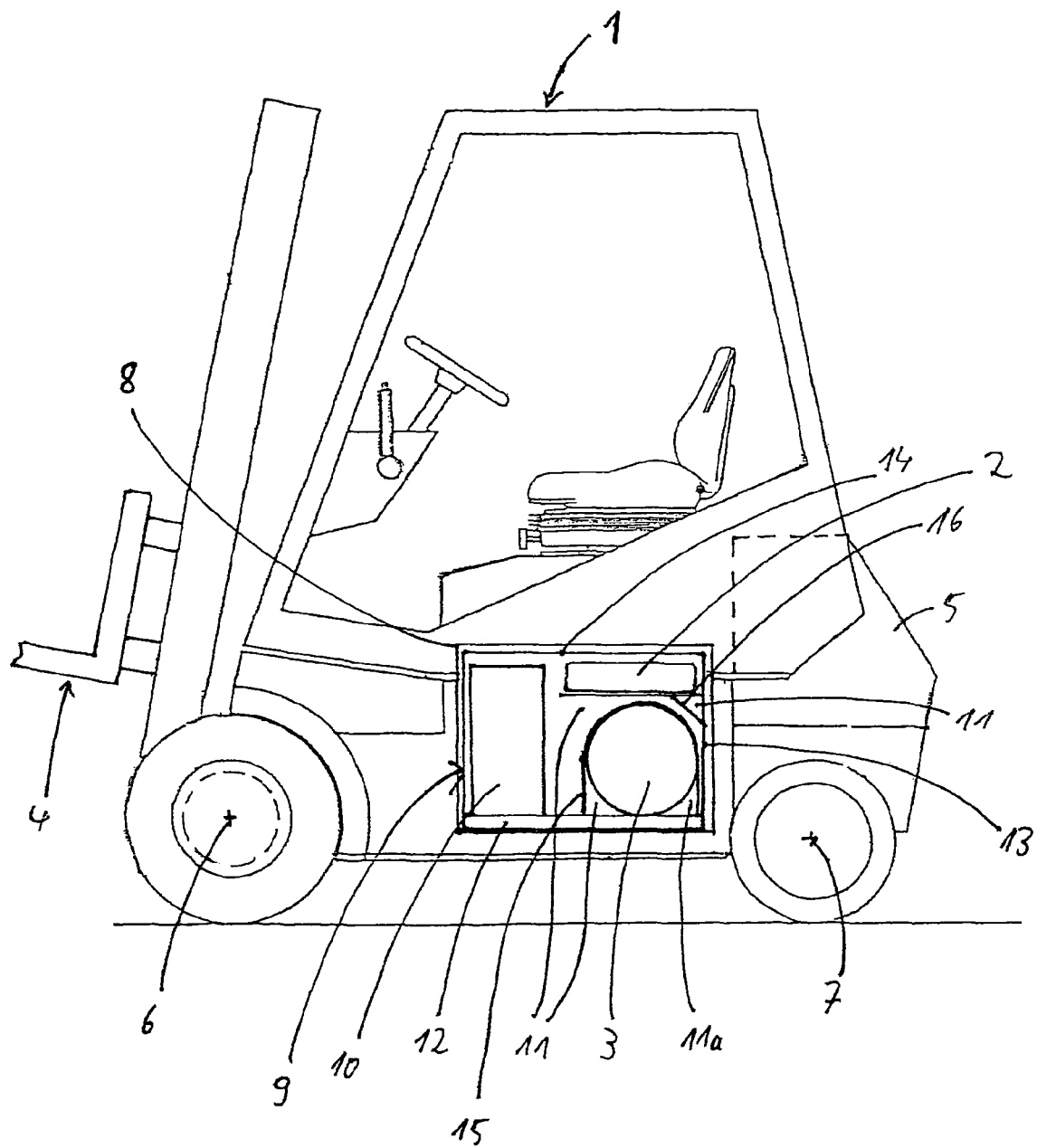
FIG. 3 shows a counterweighted fork lift truck with a fuel cell system and a pressurized hydrogen tank of the prior art.

FIG. 3 shows a counterweighted fork lift truck 1 with a fuel cell unit 2 and a hydrogen tank 3 as one example of a mobile machine that can be used in the invention. Loads are held and transported on load-holding means 4 (such as forks) that are not shown in any further detail in the drawing. To compensate for the weight of the load, there is a counterweight 5 in the stem area of the fork lift truck 1. Between a front axle 6 and a rear axle 7 of the fork lift truck 1 there is a battery compartment 8 which holds a lead battery (not shown here) or an energy supply unit 9. The energy supply unit 9 comprises essentially a fuel cell unit 2, a hydrogen tank 3, and additional auxiliary units 10 that are not illustrated in detail. The hydrogen tank 3 has the basic cylindrical shape that is conventional for such applications in the known art, and for mobile applications is preferably made of a relatively lightweight material, such as an aluminum alloy or a fiber-reinforced composite material, for example. As a result of the basic cylindrical shape of the tank 3, additional areas 11, 11a of the energy supply unit 9, in particular between the tank 3 and a base plate 12, and a wall 13 of a housing 14 of the energy supply unit 9 are not occupied. The tank 3 is fastened by means of retaining straps 15 to the base plate 12 of the energy supply unit 9. The fuel cell unit 2 is supported by a retaining device 16 which is fastened to the wall 13 of the housing 14 of the energy supply unit 9. If the energy supply unit 9 is used instead of a conventional battery tray, the useful load-carrying capacity of the vehicle 1 is less than when a lead battery is used because the latter is significantly heavier than the energy supply unit 9 and, thus, can counterweight heavier loads.

Figure 1:
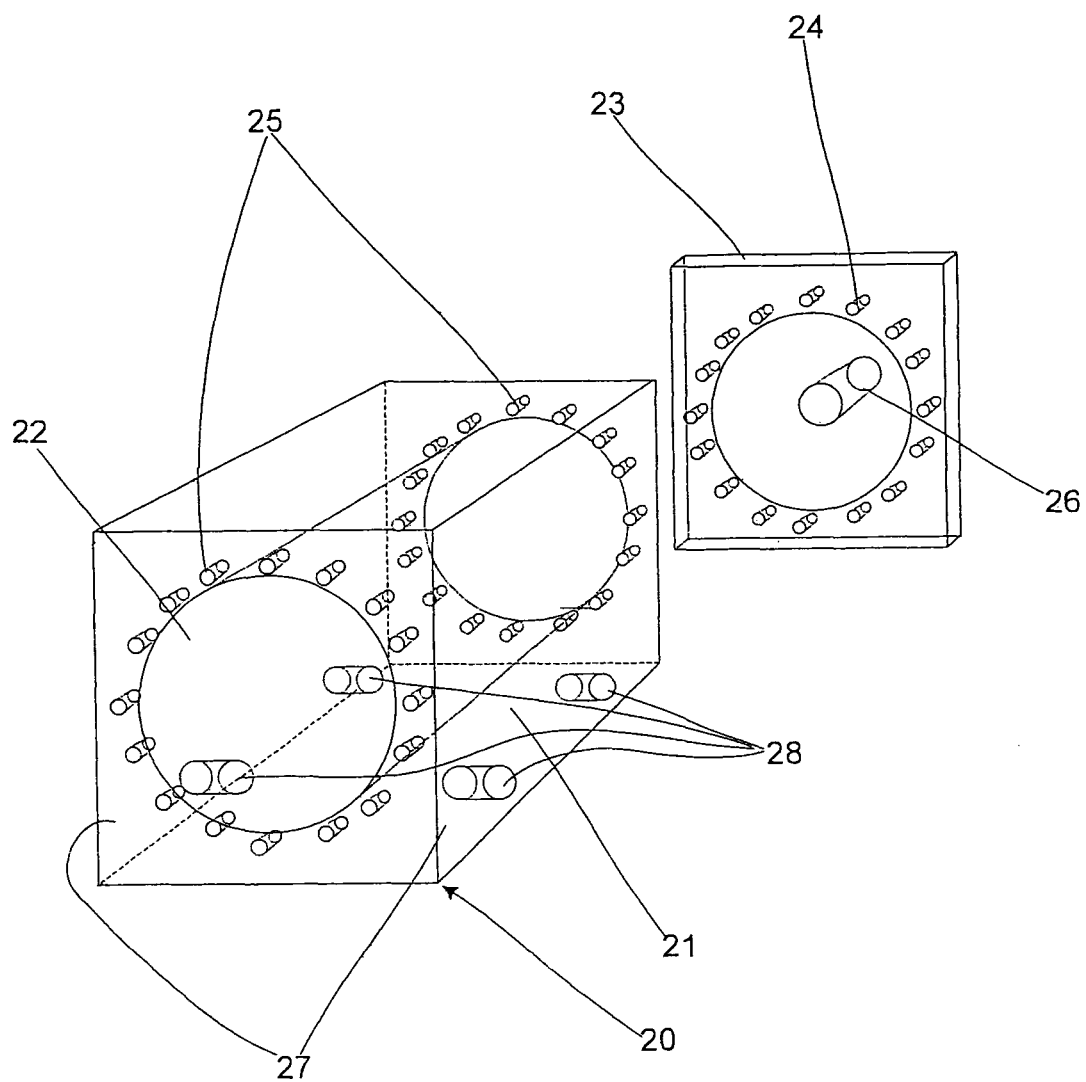
FIG. 1 shows a pressurized tank of a mobile machine of the invention.

FIG. 1 is a schematic illustration of a pressurized tank 20 of the invention for use in an industrial truck 1. The tank 20, which is fabricated from steel, includes a base body 21, which has an approximately cuboid external contour, and a cylindrical interior pressure chamber 22, as well as two closing elements 23, only one of which is shown in the drawing for the sake of simplicity. The closing element 23 can be connected, e.g., screwed, to the base body 21, for which purpose there can be suitable borings 24 in the closing element 23 and threaded borings 25 in the base body 21, and a conventional seal system (not shown here). However, other types of fastenings of the known art can potentially also be used, such as welding, for example, or the introduction of a thread on the outside diameter of a cylindrical closing element 23 and a corresponding mating thread on the end surface of the compression chamber 22. Already molded onto the closing element 23 is a pipe segment 26 to which a filling or emptying line can be connected.

As a result of its cuboid basic shape, the tank 20 can be fitted with precision into the corner 11a of the energy supply unit 9. The cavities 11, 11a are thereby filled and the weight of the energy supply unit 9 and, thus, of the fork lift truck 1 is significantly increased. The traction of the vehicle 1 is also improved if it is used for towing, as well as the cargo capacity, because the stability is favorably affected by the relatively heavy tank 20, which is located far from the front axle 6 which acts as the center of motion. In side walls 27 of the base body 21 there are borings 28 that are provided with threads, by means of which the tank 20 can be fastened to the wall 13 and the base plate 12 of the housing 14 of the energy supply unit 9. The borings 28 can also be used for the fastening of additional components so that the retaining device 16 for the fuel cell unit 2 can be omitted.

As a result of the cuboid shape, a plurality of such tanks 20 can also be located next to one another or above one another. In this case, it is also conceivable to provide the base body 21 in its longitudinal direction with dovetail guides, for example, to connect the tanks 20 to one another or to a frame and/or housing of a mobile machine or of an energy supply unit 9. On a construction of this type, it is possible by lining up a plurality of tanks 20 in a row to store even greater quantities of gas and thereby to equip different models of mobile machines with different levels of fuel requirements using only one basic shape of the tank 20 or of the base body 21.

Figure 2:
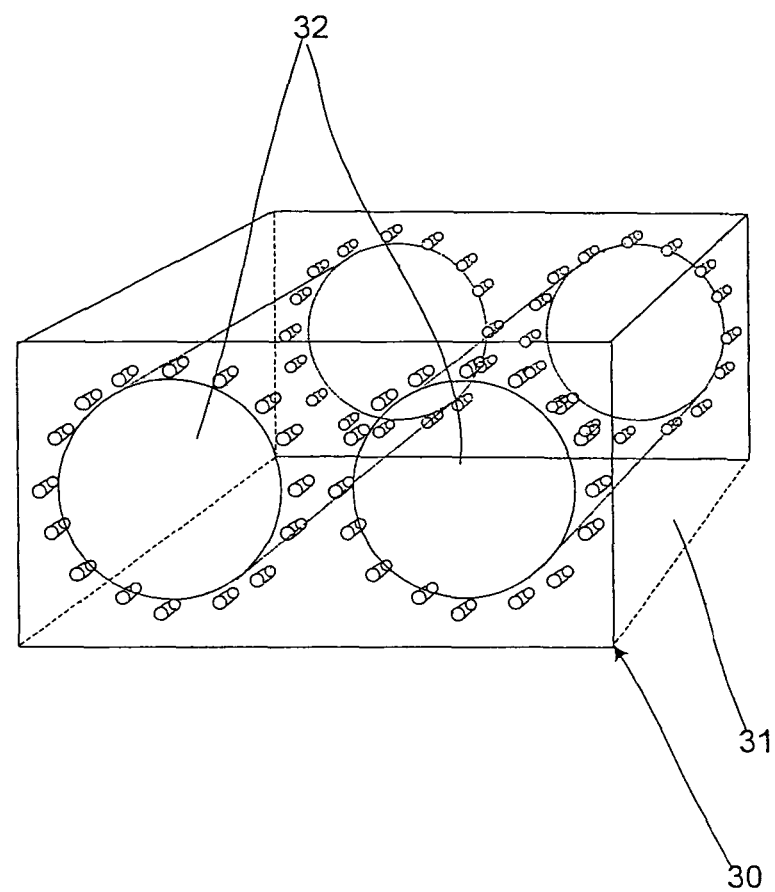
FIG. 2 shows a pressurized tank with two pressure chambers for a mobile machine of the invention.

FIG. 2 shows an additional embodiment of the invention in which two separate cylindrical pressure chambers 32 are located in a tank 30 with a cuboid base body 31. It is thereby possible to store different gases, such as hydrogen and nitrogen, in one tank 30 and/or to store one gas at different pressures. However, a tank 30 of this type can also be used instead of two individual tanks 20, each with one-half the volume, which makes a connection between the two pressure chambers 32 a good idea. This connection can be made, for example, via connecting ducts in the base body 31, although external pipes are also conceivable, which can be connected to closing elements 23 of the type shown in FIG. 1, for example.

It goes without saying that other embodiments of the invention are also conceivable. For example, the invention can be used advantageously not only on counterweighted fork lift trucks but on all mobile machines in which space is at a premium and frequently a specified minimum weight or a specified weight distribution must be achieved, i.e., for example, on other industrial trucks, especially in industrial tow trucks, the traction of which is directly related to their weight. The use of the invention has additional advantages in excavators or movable work platforms in which counterweights are used to counterbalance the loads that are carried during operation.

Naturally, the storage of gases and gas mixtures other than hydrogen is also conceivable, as well as the storage of gases that are in a liquid state under elevated pressure at ambient temperature. The cross section of the compression chambers 22, 32 can, of course, have a shape that is different from the shape shown in the illustration. For example, with a sufficient wall thickness, the cross section of the compression chambers 22, 23 can also be approximately cuboid like the external contour of the tanks 20, 30. Likewise, openings can also be provided in the base bodies 21, 31 of the tanks 20, 30, for example for the connection of pipes and/or fittings and for the routing of sensor cables. The base bodies 21, 31 can also be manufactured in different ways, depending on the material used. Suitable materials are, in particular, those that have high strength and are heavy, are easy to fabricate and work, therefore including steels in particular, whereby in particular with regard to corrosion resistance, either an alloy which is sufficiently corrosion resistant can be selected, depending on the operating conditions, and/or the pressure chambers 22, 32 can be provided with a coating. Suitable fabrication methods for the base bodies 21, 31 also include a number of different methods, whereby the preferred methods are those that make it possible to obtain the desired profile in the form of "yard goods", i.e., in approximately any desired length, such as, for example, extrusion and rolling. In this case, the extruded shape can easily be cut to length to fabricate a base body 21, 31 of the desired length. Cast base bodies 21, 31 are also conceivable.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A mobile machine, comprising:
    at least one tank to carry fuel that is in a gaseous state under normal conditions, wherein the tank is made of a ferrous metal and defines a unitary base body having an integral, one piece metal block shape with a substantially rectangular external contour in three cross-sectional planes that are perpendicular to one another;
    at least one interior pressure chamber monolithically formed by an internal contour of the base body, wherein the interior pressure chamber has a substantially circular cross section in at least one cross-sectional plane; and
    at least one closing element connectable to the base body to seal said at least one interior pressure chamber.

2. The mobile machine as claimed in claim 1, wherein said pressure chamber of the tank is provided with a coating.

3. The mobile machine as claimed in claim 1, wherein the closing element comprises at least one fitting or at least one connecting device for at least one fitting or pipe.

4. The mobile machine as claimed in claim 3, wherein the base body of the tank comprises at least one connecting device for at least one fitting or at least one pipe.

5. The mobile machine as claimed in claim 1, wherein the base body of the tank comprises at least one connecting device for at least one fitting or at least one pipe.

6. The mobile machine as claimed in claim 1, wherein the tank has at least two separate pressure chambers formed by internal contours of the base body.

7. The mobile machine as claimed in claim 1, wherein the tank includes devices for fastening the tank to the mobile machine or to additional tanks.

8. The mobile machine as claimed in claim 1, wherein the tank is provided for the storage of hydrogen.

9. The mobile machine as claimed in claim 1, wherein the tank is made of steel.

10. A pressurized tank for a mobile machine, comprising:
    a unitary base body made of steel and having an integral, one piece metal block shape with a substantially rectangular external contour in three cross-sectional planes that are perpendicular to one another;
    at least one interior pressure chamber monolithically formed by an interior contour of the base body and having a substantially curved cross section in at least one cross-sectional plane; and
    at least one closing element connectable with the base body to seal the at least one pressure chamber.

11. The mobile machine as claimed in claim 10, wherein said pressure chamber of the tank is provided with a coating.

12. The mobile machine as claimed in claim 10, wherein the closing element comprises at least one fitting or at least one connecting device for at least one fitting or pipe.

13. The mobile machine as claimed in claim 10, wherein the tank has at least two separate pressure chambers.

* * * * *